(12) United States Patent
Kawahara et al.

(10) Patent No.: US 9,004,248 B2
(45) Date of Patent: Apr. 14, 2015

(54) POWER TRANSMISSION DEVICE FOR TORQUE CONVERTER (75) Inventors: Yuki Kawahara, Osaka (JP); Yoshihiro Matsuoka, Neyagawa (JP); Mitsuru Kuwahata, Neyagawa (JP); Shinji Fujimoto, Hirakata (JP)

(73) Assignee: EXEDY Corporation, Osaka (JP)

( * ) Notice: Subject to any disclaimer, the term of this patent is extended or adjusted under 35 U.S.C. 154(b) by 299 days.

(21) Appl. No.: 13/500,599

(22) PCT Filed: Oct. 15, 2010

(86) PCT No.: PCT/JP2010/068118
§ 371 (c)(1),
(2), (4) Date: Apr. 5, 2012

(87) PCT Pub. No.: WO2011/055622
PCT Pub. Date: May 12, 2011

(65) Prior Publication Data
US 2012/0217113 A1    Aug. 30, 2012

(30) Foreign Application Priority Data

Nov. 5, 2009  (JP) ................. 2009-253779
Dec. 9, 2009  (JP) ................. 2009-279085
Dec. 17, 2009 (JP) ................. 2009-286412

(51) Int. Cl.
F16H 45/02    (2006.01)
F16F 15/134   (2006.01)
F16F 15/139   (2006.01)

(52) U.S. Cl.
CPC .......... *F16H 45/02* (2013.01); *F16F 15/13484* (2013.01); *F16F 15/1397* (2013.01);
(Continued)

(58) Field of Classification Search
USPC ........................................ 192/213
See application file for complete search history.

(56) References Cited

U.S. PATENT DOCUMENTS 4,693,348 A      9/1987  Tsukamoto et al.
2001/0008198 A1  7/2001  Maienschein et al.
(Continued)

FOREIGN PATENT DOCUMENTS

DE   10352963 A1   5/2004
DE   10358901 A1   2/2005
(Continued)

OTHER PUBLICATIONS

Chinese Office Action of the corresponding Chinese Application No. 201080049914.7, dated Aug. 2, 2013.
(Continued)

*Primary Examiner* — Ramya Burgess
*Assistant Examiner* — Mark Manley
(74) *Attorney, Agent, or Firm* — Global IP Counselors, LLP (57) ABSTRACT It is an object of the present invention to achieve reduction in size and weight of, and inhibition of axial size increase of, a power transmission device for a torque converter including a turbine functioning as an inertia element. The power transmission device includes a torque transmission plate fixed to a turbine, a damper mechanism disposed between a front cover and the turbine, and an engaging part. The damper mechanism elastically couples the torque transmission plate and a transmission-side member. The engaging part couples the torque transmission plate and the damper mechanism on a radially inner side of a torus center C of a torque converter main body.

11 Claims, 7 Drawing Sheets (52) U.S. Cl.
CPC . *F16H2045/0205* (2013.01); *F16H 2045/0226* (2013.01); *F16H 2045/0231* (2013.01); *F16H 2045/0278* (2013.01)

(56) References Cited

U.S. PATENT DOCUMENTS

| 2009/0045023 A1* | 2/2009 | Uhler | 192/3.29 |
| 2009/0133978 A1* | 5/2009 | Degler et al. | 192/3.29 |
| 2009/0152066 A1* | 6/2009 | Degler et al. | 192/3.29 |

FOREIGN PATENT DOCUMENTS

| JP | H06-280940 A | 10/1994 |
| JP | H11-173382 A | 6/1999 |
| JP | H11-173383 A | 6/1999 |
| JP | 2000-002312 A | 1/2000 |
| JP | 2001-082577 A | 3/2001 |
| JP | 2006-105276 A | 4/2006 |
| WO | 2007054047 A2 | 5/2007 |

OTHER PUBLICATIONS

German Office Action of the corresponding German Patent Application No. 112010004302.7, dated Sep. 4, 2014.

* cited by examiner

POWER TRANSMISSION DEVICE FOR TORQUE CONVERTER

CROSS-REFERENCE TO RELATED APPLICATIONS

This U.S. national phase application claims priority to Japanese Patent Application Nos. 2009-253779, 2009-279085, and 2009-286412 filed on Nov. 5, 2009, Dec. 9, 2009, and Dec. 17, 2009 respectively. The entire disclosure of Japanese Patent Application Nos. 2009-253779, 2009-279085, and 2009-286412 is hereby incorporated herein by reference.

BACKGROUND

1. Technical Field

The present invention relates to a power transmission device, particularly to a power transmission device disposed between a torque converter main body and a front cover coupled to an engine-side member in order to transmit torque outputted from a turbine of the torque converter main body to a transmission-side member.

2. Background Art

The torque converters normally include a front cover and a torque converter main body. The front cover is coupled to an engine-side member, while the torque converter main body is coupled to the front cover. Torque inputted through the front cover is transmitted towards a transmission through the torque converter main body. Torque converter main body includes an impeller, a turbine and a stator. The impeller is coupled to the front cover. The turbine is coupled to a transmission-side member. The stator is configured to regulate the flow of operating fluid returning from the turbine to the impeller.

Patent Literature 1 describes an exemplary torque converter structured as described above. In the torque converter, a damper mechanism including torsion springs is disposed between the turbine and the transmission-side member. In the torque converter of this type, torque is transmitted from the turbine to the transmission-side member through the damper mechanism.

Further, Patent Literature 2 describes an exemplary damper mechanism employed for a lock-up device of a torque converter. In the damper mechanism, reduction in stiffness and expansion in a torsion angle for the torsion springs are herein required to eliminate and attenuate variation in torque inputted thereto from the engine. In view of this, the damper mechanism described in Patent Literature 2 includes torsion springs disposed on the radial inner part thereof and those disposed on the radial outer part thereof. Further, the radially inner side torsion springs and the radially outer side torsion springs are configured to act in series through an intermediate member.

CITATION LIST

Patent Literature

PTL1: Japan Laid-open Patent Application Publication No. JP-A-2000-002312
PTL2: Japan Laid-open Patent Application Publication No. JP-A-2001-082577

SUMMARY

Technical Problems

In the torque converter described in Patent Literature 1, the turbine, functioning as an inertia element, is disposed closer to the input side (i.e., the engine side) than the torsion springs of the damper mechanism are. In this type of structure, the resonance rotation speed is shifted to a rotation speed range lower than that of the normal rotation speed. Vibrations can be thereby reduced as much as possible.

Meanwhile, the structure described in Patent Literature 1 includes an engaging part for coupling the turbine and the damper mechanism on the radial outer part of the turbine. In this case, a turbine-side member and a damper-side member, forming the engaging part, are both formed in larger sizes. Accordingly, mass of the respective members for engagement is increased and becomes an obstacle against weight reduction and even against reduction in fuel consumption.

In the damper mechanism described in Patent Literature 2, on the other hand, the radially outer side torsion springs and the radially inner side torsion springs are configured to act in series. Therefore, the damper torsion angle is widened. To thus widen the damper torsion angle, it is required to increase the coil diameter of the radially inner side torsion springs and that of the radially outer side torsion springs. From the perspective of strength, it is herein required to produce a predetermined distance from a torsion spring holding part to a tip in each plate holding the radially inner/outer side torsion springs. However, the radially inner side torsion springs and the radially outer side torsion springs are disposed closer to each other when the coil diameter of the radially inner side torsion springs and that of the radially outer side torsion springs are increased. This produces a drawback that sufficient distance cannot be easily produced between the torsion spring holding part and the tip in each plate. In consideration of compatibility with vehicle characteristics, it is further required to set hysteresis torque with appropriate characteristics in the damper device. It is demanded that the characteristics can be easily changed depending on vehicles employing the damper device.

Further, the damper mechanism is provided with a stopper part. The stopper part is configured to restrict the relative rotational angle (i.e., torsion angle) between the input-side member and the output-side member to be in a predetermined angular range in order to prevent excessive stress from being applied to the torsion springs. In the damper mechanism described in Patent Literature 1, the stopper part is formed by inserting rivets into notches. The input-side member and the output-side member are herein allowed to be rotated relatively to each other within an angular range that each notch is formed. When each rivet makes contact with the ends of each notch, relative rotation between the both members is prevented.

In the well-known damper mechanisms, plural rivets or pins are required for forming the stopper part as described above.

It is an object of the present invention to achieve reduction in size and weight of, and inhibition of axial size increase of, a power transmission device for a torque converter including a turbine functioning as an inertia element.

It is another object of the present invention to employ a torsion spring with a large coil diameter as an elastic member to be used for a damper mechanism in order to widen a damper torsion angle.

It is yet another object of the present invention to easily regulate hysteresis torque with a simple structure.

It is further yet another object of the present invention to realize a stopper part with a simple structure particularly in a power transmission device including a damper mechanism with a widened torsion angle.

Solution to Problems

A power transmission device for a torque converter according to a first aspect of the present invention is a device disposed between a torque converter main body and a front cover coupled to an engine-side member. The power transmission device is configured to transmit torque outputted from a turbine of the torque converter main body to a transmission-side member. The power transmission device includes an output member, a damper mechanism and an engaging part. The output member is fixed to the turbine. The damper mechanism is disposed between the front cover and the turbine. The damper mechanism elastically couples the output member and the transmission-side member. The engaging part couples the output member and the damper mechanism on a radially inner side of a torus center of the torque converter main body.

According to the power transmission device, torque inputted from the front cover to the torque converter main body is outputted from the turbine, and the torque is then outputted to the transmission-side member through the output member and the damper mechanism. The torque from the output member is transmitted to the damper mechanism through the engaging part, and is further transmitted to the transmission-side member. Further, the engaging part, coupling the output member and the damper mechanism, is disposed on the radially inner side of the torus center.

The output member and the damper mechanism are herein coupled through the engaging part disposed on the radially inner side of the torus center. Thus, the engaging part is positioned radial inwards of that provided in a well-known power transmission device. Therefore, members forming the engaging part can be compactly formed and weight reduction thereof can be realized. Further, the turbine and the front cover are separated away from each other as much as possible on the radially inner side of the torus center. In other words, a relatively large space is formed therein. Therefore, the engaging part can be disposed in the relatively large space and axial size increase thereof can be inhibited.

A power transmission device for a torque converter according to a second aspect of the present invention relates to the power transmission device for a torque converter according to the first aspect of the present invention. In the power transmission device, the output member includes either a plurality of grooves or a plurality of protrusions. The damper mechanism includes a first input plate, an output-side member and a plurality of first elastic members. The first input plate includes either a plurality of protrusions to be engaged with the grooves of the output member or a plurality of grooves to be engaged with the protrusions of the output member. The output-side member is coupled to the transmission-side member. The plural first elastic members elastically couple the first input plate and the output-side member in a rotational direction. Further, the engaging part is formed by the grooves or the protrusions formed in the output member and the protrusions or the grooves formed in the first input plate. The engaging part is positioned radially inwards of the first elastic members.

The engaging part is herein positioned radially inwards of the first elastic members. Similarly to the aforementioned aspect of the present invention, it is possible to achieve reduction in size and weight of, and inhibition of axial size increase of, the engaging part. Further, the engaging part is formed by a part of the output member and a part of the first input plate. Therefore, the engaging part can be formed with a simple structure.

A power transmission device for a torque converter according to a third aspect of the present invention relates to the power transmission device for a torque converter according to the second aspect of the present invention. In the power transmission device, the output member is a disc-shaped plate including an inner periphery fixed to an inner periphery of the turbine and an outer periphery having either a plurality of grooves or a plurality of protrusions. Further, the first input plate is a disc-shaped plate including a support portion supporting the plural first elastic members and an inner periphery having either a plurality of protrusions to be engaged with the grooves of the output member or a plurality of grooves to be engaged with the protrusions of the output member.

A power transmission device for a torque converter according to a fourth aspect of the present invention relates to the power transmission device for a torque converter according to the second aspect of the present invention. The power transmission device further includes a second input plate, a pair of output plates and a plurality of second elastic members. The second input plate is disposed axially away from the first input plate at a predetermined interval. The paired output plates are allowed to be coupled to the transmission-side member. The paired output plates are disposed away from each other at a predetermined interval. Each of the first and second input plates (i.e., the input plates) is a disc-shaped plate. The plural first elastic members are supported by the paired input plates. A plurality of second elastic members are supported by the paired output plates on a radially inner side of the plural first elastic members for transmitting torque to the paired output plates. Further, the output-side member is disposed axially between the paired input plates. The output-side member causes the first elastic members and the second elastic members to act in series. Yet further, a part of the paired input plates and a part of the paired output plates are opposed in a direction along a rotational axis.

According to the power transmission device, torque inputted into the paired input plates is transmitted to the paired output plates through the plural first elastic members, the output-side member and the plural second elastic members. Further, the torque is transmitted to the transmission-side member.

A part of the paired input plates and a part of the paired output plates are herein opposed in the direction along the rotational axis. In other words, a part of the paired input plates and a part of the paired output plates are displaced in the direction along the rotational axis. This can avoid interference between the both types of plates. It is thereby possible to extend a distance between the plate tip part and the elastic-member holding part in each plate. Consequently, in using torsion springs as the first and second elastic members, it is possible to use the torsion springs with a large coil diameter. Accordingly, a damper torsion angle can be widened as much as possible.

A power transmission device for a torque converter according to a fifth aspect of the present invention relates to the power transmission device for a torque converter according to the fourth aspect of the present invention. In the power transmission device, each of the paired input plates has an annular shape and includes a plurality of window holes for supporting the plural first elastic members. Further, each of the paired output plates has an annular shape and includes a plurality of window holes for supporting the plural second elastic members. Each of the paired output plates is disposed radially inwards of the paired input plates. Yet further, the paired input plates include outer peripheries inserted between inner peripheries of the paired input plates for partially overlapping the output plates and the input plates in the direction along the rotational axis.

Therefore, it is possible to reliably obtain sufficient strength for the input and output plates and use torsion springs with a large coil diameter as the elastic members, similarly to the aforementioned aspect.

A power transmission device for a torque converter according to a sixth aspect of the present invention relates to the power transmission device for a torque converter according to the fourth aspect of the present invention. The power transmission device further includes an output hub fixed to the paired output plates. Further, the output-side member and the output hub are rotatable relatively to each other in a predetermined angular range.

A power transmission device according to a seventh aspect of the present invention relates to the device according to the fourth aspect of the present invention. In the device, the opposed parts of the paired input plates and the paired output plates in the direction along the rotational axis slidably make contact with each other.

A part of the paired input plates and a part of the paired output plates herein slide in contact with each other when the paired input plates and the paired output plates are rotated relatively to each other. Accordingly, hysteresis torque is produced. Thus, hysteresis torque is produced using the input plates and the output plates. Therefore, a hysteresis torque producing mechanism can be realized with a simple structure. Further, hysteresis torque can be arbitrarily regulated by changing specifications (e.g., stiffness, arrangement, size, etc.) of each plate.

A power transmission device for a torque converter according to an eighth aspect of the present invention relates to the power transmission device for a torque converter according to the second aspect of the present invention. The power transmission device further includes a second input plate, a pair of output plates and a plurality of second elastic members. The second input plate is disposed axially away from the first input plate at a predetermined interval. The paired output plates are allowed to be coupled to the transmission-side member while being disposed away from each other at a predetermined interval. Each of the first and second input plates (i.e., the paired input plates) is a disc-shaped plate. The first elastic members are supported by the paired input plates. The plural second elastic members are supported by the paired output plates on a radially inner side of the plural first elastic members for transmitting torque to the paired output plates. Further, the output-side member is disposed axially between the paired input plates for causing the first elastic members and the second elastic members to act in series. Yet further, the paired input plates and the paired output plates form a pair of stopper parts. The stopper parts are configured to cause the paired input plates and the paired output plates to be engaged when a relative rotation angle between the paired input plates and the paired output plates exceeds a predetermined relative rotation angular range.

According to the power transmission device, the input plates and the output plates are configured to be rotated relatively to each other (distorted in the rotational direction) when the plural first elastic members and the plural second elastic members are elastically deformed. The torsion angle is restricted by the stopper parts formed in the paired input plates and the paired output plates.

The torsion angle between the input plates and the output plates is herein restricted by the stopper parts formed in the input plates and the output plates. Therefore, it is not required to provide members (e.g., rivets, pins, etc.) normally provided in a well-known device. Therefore, the stopper parts can be realized with a simple structure.

A power transmission device for a torque converter according to a ninth aspect of the present invention relates to the power transmission for a torque converter according to the eighth aspect of the present invention. In the power transmission device, the paired input plates and the paired output plates respectively have an annular shape. The paired output plates are disposed radially inwards of the input plates. Further, each of the paired input plates includes a plurality of input-side engaging portions on an inner peripheral edge thereof. The input-side engaging portions are aligned at predetermined intervals in a rotational direction. Yet further, each of the paired output plates includes a plurality of output-side engaging portions on an outer peripheral edge thereof. The output-side engaging portions are aligned at predetermined intervals in a rotational direction. The plural output-side engaging portions are engaged with the plural input-side engaging portions.

The output plates are herein disposed radially inwards of the input plates. Therefore, the stopper parts can be formed using the inner peripheral edges of the input plates and the outer peripheral edges of the output plates.

A power transmission device for a torque converter according to a tenth aspect of the present invention relates to the power transmission device for a torque converter according to the ninth aspect of the present invention. In the power transmission device, the input-side engaging portions are first protrusions protruded axially outwards. Each of the first protrusions includes a first space on an axially inner side thereof. The first space is formed in a first rotation angular range. Further, the output-side engaging portions are second protrusions protruded axially outwards. Each of the second protrusions is inserted into each of the first spaces. Each of the second protrusions is formed on an axially outer side of each of the paired output plates in a second rotation angular range less than the first rotation angular range.

It should be noted that the term "axially outer side" refers to "the transmission side" for the transmission-side one of the paired input plates and refers to "the engine side" for the engine-side one of the paired input plates.

The first protrusions and the second protrusions can be herein formed on the corresponding plates by means of press pressing. Therefore, the stopper parts can be easily formed.

A power transmission device for a torque converter according to an eleventh aspect of the present invention relates to the power transmission device for a torque converter according to the ninth aspect of the present invention. In the power transmission device, the input-side engaging portions are a plurality of pawls formed at the predetermined intervals on the inner peripheral edge of each of the paired input plates. Further, the output-side engaging portions are notches formed on the outer peripheral edge of each of the paired output plates. Each of the notches receives each of the plural pawls to be inserted therein for allowing each of the plural pawls to be rotated in a predetermined angular range.

The stopper parts can be herein also formed on the respective plates by means of press processing, and can be easily manufactured, similarly to the aforementioned aspect.

Advantageous Effects of the Invention

According to the present invention as described above, it is possible to achieve reduction in size and weight of, and inhibition of axial size increase of, a power transmission device for a torque converter including a turbine functioning as an inertia element.

Further, it is possible to easily obtain sufficient strength required for holding elastic members, especially, in a power transmission device including a damper mechanism with a widened damper torsion angle. Yet further, it is possible to easily regulate hysteresis torque using elements of a damper mechanism on an as-needed basis.

Moreover, stopper parts of a damper mechanism can be realized with a simple structure.

DETAILED DESCRIPTION OF EXEMPLARY EMBODIMENTS

First Exemplary Embodiment

Figure 1:
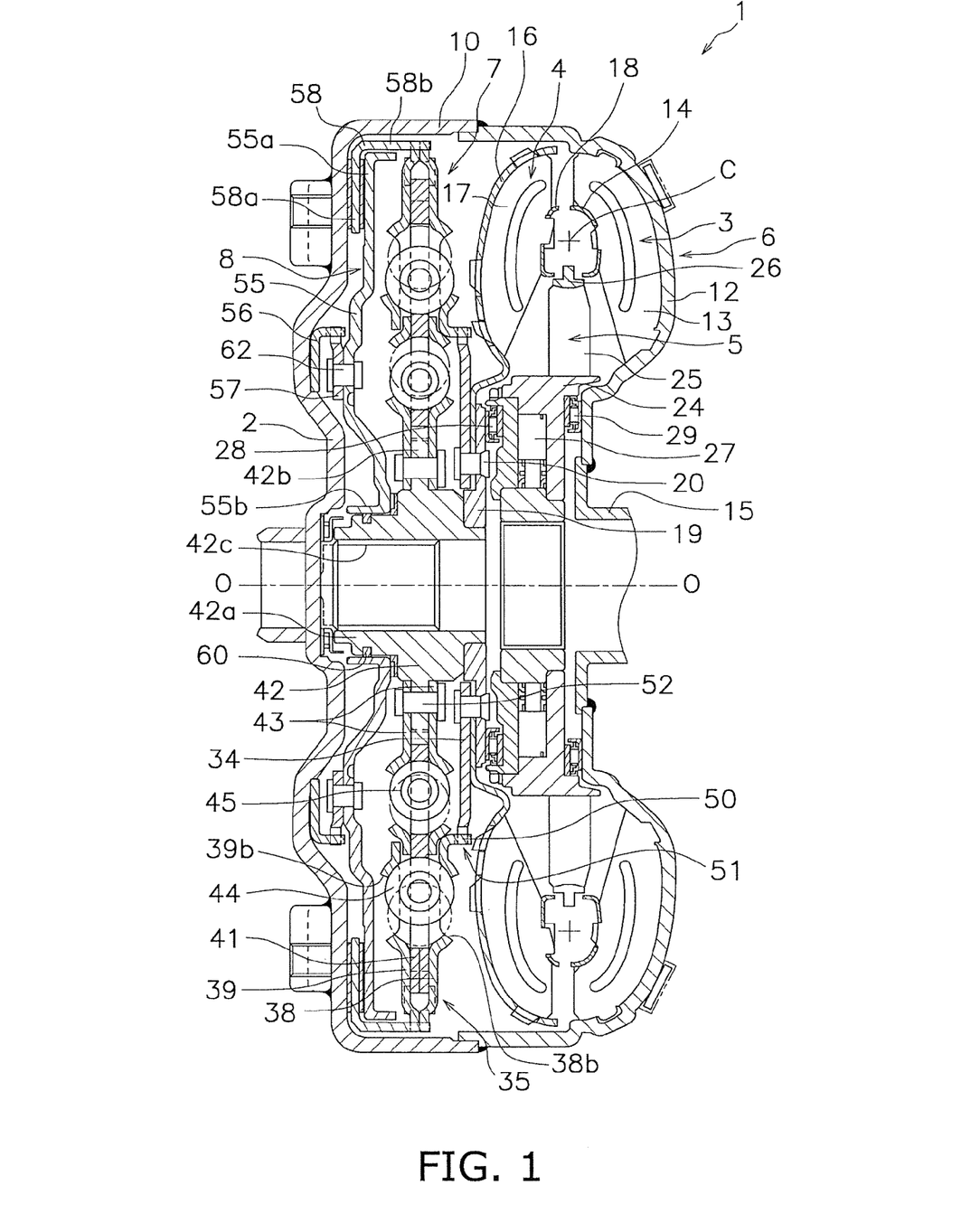
FIG. 1 is a partial cross-sectional view of a torque converter including a power transmission device according to a first exemplary embodiment of the present invention.
Figure 2:
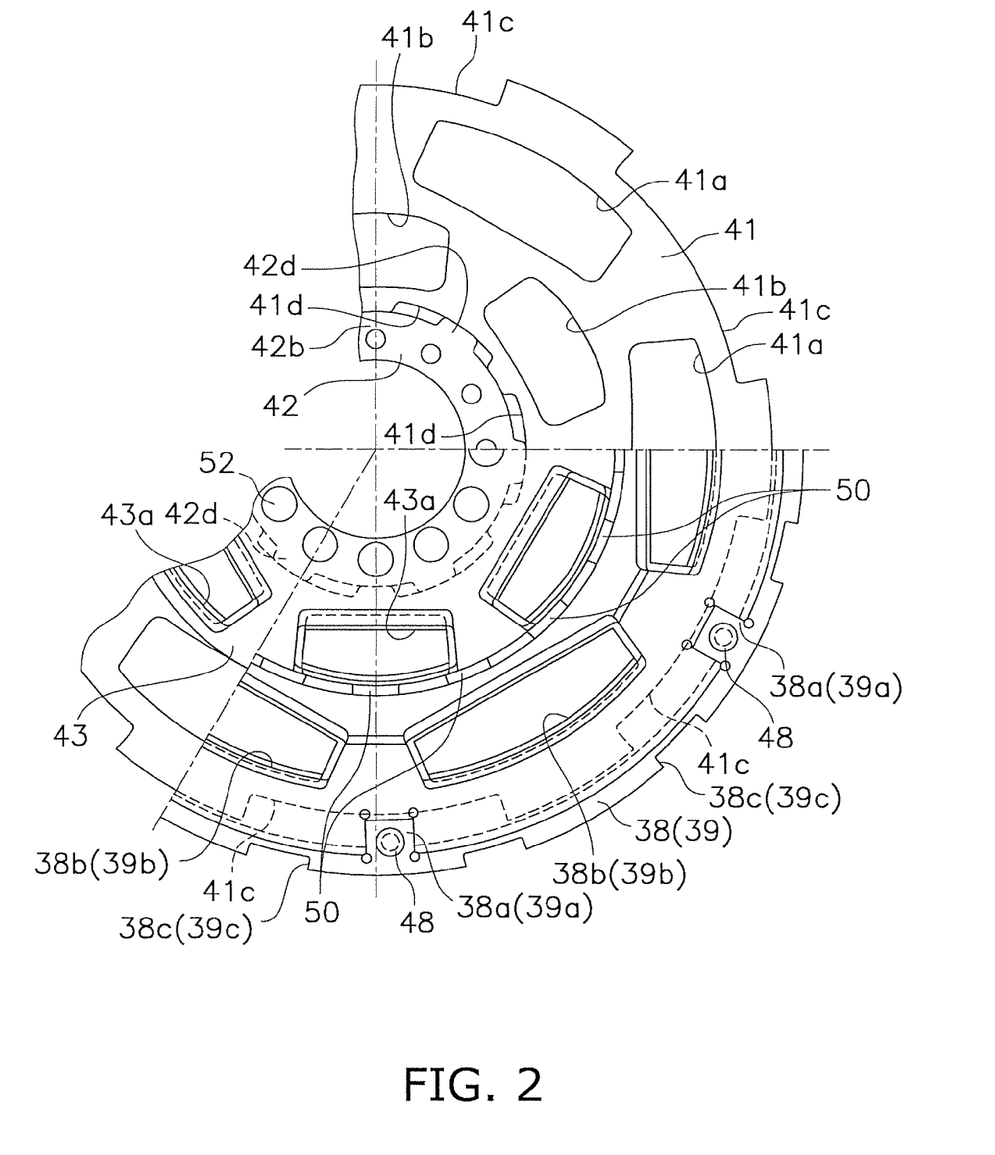
FIG. 2 is a partial front view of the power transmission device.

FIG. 1 is a partial cross-sectional view of a torque converter 1 provided with a power transmission device according to a first exemplary embodiment of the present invention. In FIG. 1, an engine (not illustrated in the figure) is disposed on the left side, while a transmission (not illustrated in the figure) is disposed on the right side. FIG. 2 is a partial front view of the power transmission device. FIG. 2 omits illustration of torsion springs used as elastic members and some of the other members. It should be noted that FIG. 1 illustrated a line O-O as a rotational axis of the torque converter.

(Entire Structure of Torque Converter)

The torque converter 1 is a device configured to transmit torque from an engine-side crankshaft (not illustrated in the figures) to an input shaft of the transmission. The torque converter 1 includes a front cover 2, a torque converter main body 6, a power transmission device 7 and a lock-up device 8. The front cover 2 is herein fixed to engine-side members. The torque converter main body 6 is formed by three types of vanes (i.e., an impeller 3, a turbine 4 and a stator 5).

The front cover 2 is a disc-shaped member and includes an outer peripheral tubular portion 10 on the outer periphery thereof. The outer peripheral tubular portion 10 is axially protruded towards the transmission. The impeller 3 includes an impeller shell 12, a plurality of blades 13, a core 14 and an impeller hub 15. The impeller shell 12 is fixed to the outer peripheral tubular portion 10 of the front cover 2 by means of welding. The blades 13 are fixed to the inside of the impeller shell 12. The core 14 is disposed in the inside of the blades 13. The impeller hub 15 is a tubular member disposed on the inner peripheral part of the impeller shell 12. The turbine 4 is faced to the impeller 3 within a fluid chamber. The turbine 4 includes a turbine shell 16, a plurality of blades 17, a core 18 and a turbine support 19. The blades 17 are fixed to the turbine shell 16. The core 18 is disposed in the inside of the blades 17. The turbine support 18 is fixed to the inner peripheral part of the turbine shell 16. The turbine support 19 is a disc-shaped plate. The turbine support 19 and the turbine shell 16 are fixed by means of a plurality of rivets 20.

The stator 5 is a mechanism disposed between the inner periphery of the impeller 3 and that of the turbine 4 in order to regulate the flow of operating oil returning from the turbine 4 to the impeller 3. The stator 5 includes a stator carrier 24, a plurality of blades 25 and a core 26. The stator carrier 24 is a disc-shaped member. The blades 25 are disposed on the outer peripheral surface of the stator carrier 24. The core 26 is disposed on the outer peripheries of the blades 25. The stator carrier 24 is supported by a stationary shaft (not illustrated in the figures) through a one-way clutch 27. It should be noted that a thrust bearing 28 is disposed between the turbine support 19 and the one-way clutch 27, while a thrust bearing 29 is disposed between the stator carrier 24 and the impeller shell 12.

(Power Transmission Device)

The power transmission device 7 includes a torque transmission plate (output member) 34 and a damper mechanism 35. The torque transmission plate 34 is fixed to the turbine support 19.

<Torque Transmission Plate>

The torque transmission plate 34 is a disc-shaped member and the inner peripheral edge thereof is fixed to the turbine support 19, together with the turbine shell 16, by means of the rivets 20. The torque transmission plate 34 includes a plurality of grooves on the outer periphery thereof. The grooves are herein circumferentially aligned at predetermined intervals.

<Damper Mechanism>

As illustrated in FIGS. 1 and 2, the damper mechanism 35 includes first and second retaining plates 38 and 39 (a pair of input plates), a hub flange 41 (an output-side member), a turbine hub 42, a pair of clutch plates 43 (a pair of output plates), a plurality of radially outer side torsion springs 44 (first elastic members) and a plurality of radially inner side torsion springs 45 (second elastic members).

The first and second retaining plates 38 and 39 are disc-shaped members disposed axially away from each other. As illustrated in FIG. 2, the first retaining plate 38 includes a plurality of press-drawn portions 38a on the outer peripheral part thereof, while the second retaining plate 39 includes a plurality of press-drawn portions 39a on the outer peripheral part thereof. Although only the press-drawn portions 38a of the first retaining plate 38 are illustrated in FIG. 2, the second retaining plate 39 includes the press-drawn portions 39a respectively having the same shape as that of the press-drawn port ions 38a in the same positions as the press-drawn portions 39a. The press-drawn portions 38a of the first retaining plate 38 make contact with the press-drawn portions 39a of the second retaining plate 39. The press-drawn portion 38a and the press-drawn portions 39a are coupled by means of rivets 48. Therefore, the first and second retaining plates 38 and 39 are configured to be rotated in synchronization with each other. Further, the first retaining plate 38 includes a plurality of window holes 38b circumferentially aligned at predetermined intervals, while the second retaining plate 39 includes a plurality of window holes 39b circumferentially aligned at predetermined intervals. The radially outer side torsion springs 44 are supported by the window holes 38b and the window holes 39b. Torque inputted into the first and second retaining plates 38 and 39 is transmitted to the radially outer side torsion springs 44 through the window holes 38b and the window holes 39b.

Further, the first retaining plate 38 includes a plurality of protrusions 50 on the inner peripheral edge thereof. The protrusions 50 are axially protruded towards the transmission (i.e., rightward in FIG. 1). As illustrated in FIG. 2, the protrusions 50 are circumferentially aligned at predetermined intervals. The protrusions 50 are engaged with the grooves formed on the outer periphery of the torque transmission plate 34. It should be noted that the torque transmission plate 34 is removed in the condition illustrated in FIG. 2.

As described above, an engaging part 51 is formed by the plural grooves formed on the outer periphery of the torque transmission plate 34 and the plural protrusions 50 formed on the first retaining plate 38. With the engagement between the grooves and the protrusions 50, torque is transmitted from the turbine 4 to the first and second retaining plates 38 and 39. Further, the engaging part 51 is positioned inwards of a center C (see FIG. 1) of a torus of the torque converter main body 6 in the radial direction of the torque converter 1. Yet further, the engaging part 51 is positioned inwards of the radially outer side torsion springs 44 in the radial direction of the torque converter 1. It should be noted that the center C of the torus is the center of a space enclosed by the core 14 of the impeller 3, the core 18 of the turbine 4 and the core 26 of the stator 5. In the torque converter main body 6, each of the impeller 3 and the turbine 4 generally has a circular-arc cross-section, as is obvious from FIG. 3. Further, the shell 12 of the impeller 3 is bulged outermost (i.e., towards the transmission) in a part thereof disposed in the same radial position as the torus center, while the shell 16 of the turbine 4 is bulged outermost (i.e., towards the engine) in a part thereof disposed in the same radial position as the torus center. Therefore, a relatively large space is produced between the damper mechanism 35 and the turbine 4 on a position inward of the torus center in the radial direction of the torque converter 1.

In view of the above, the engaging part 51, formed by the turbine 4 and the damper mechanism 35, is herein disposed in the relatively large space produced inwards of the torus center C in the radial direction of the torque converter 1.

Further, the first retaining plate 38 includes a plurality of outwardly opened notches 38c aligned at equal angular intervals on the outer peripheral edge thereof, while the second retaining plate 39 includes a plurality of outwardly opened notches 39c aligned at equal angular intervals on the outer peripheral edge thereof. The notches 38c and the notches 39c function as an engaging part with the lock-up device 8.

The hub flange 41 has a disc shape and is interposed and held between the first retaining plate 38 and the second retaining plate 39.

As is obvious from FIG. 2, the hub flange 41 includes a plurality of radially outer side elongated holes 41a on a radially outer part thereof. Each radially outer side elongated hole 41a is relatively elongated in the circumferential direction. Further, the hub flange 41 includes a plurality of radially inner side elongated holes 41b on a radially inner part thereof. Each radially inner side elongated hole 41b is shorter than each radially outer side elongated hole 41a in the circumferential direction. The radially outer side elongated holes 41a are positioned to be matched with the window holes 38b and 39b of the first and second retaining plates 38 and 39. Further, the circumferential centers of the radially outer side elongated holes 41a are displaced from those of the radially inner side elongated holes 41b. Simultaneously, the circumferential centers of the radially outer side elongated holes 41a and those of the radially inner side elongated holes 41b are alternately positioned in the circumferential direction. Each radially outer side elongated hole 41a accommodates each radially outer side torsion spring 44, while each radially inner side elongated hole 41b accommodates each radially inner side torsion spring 45.

Further, the hub flange 41 includes a plurality of notches 41c on the outer peripheral edge thereof. The notches 41c are opened to the radially inward of the hub flange 41 while being arranged at equal angular intervals. Each notch 41c accommodate each pair of the press-drawn portions 38a and 39a, coupled by means of each rivet 48, of the first and second retaining plates 38 and 39. Therefore, each pair of the press-drawn portions 38a and 39a makes contact with a circumferential ends of each notch 41c when the first and second retaining plates 38 and 39 are rotated relatively to the hub flange 41. Thus, relative rotation is restricted between the hub flange 41 and the first and second retaining plates 38 and 39. In other words, the notches 41c and the press-drawn portions 38a and 39a form a stopper part.

The hub flange 41 includes a plurality of notches 41d on the inner peripheral edge thereof. The notches 41d are opened to the radially inward of the hub flange 41 while being aligned at equal angular intervals.

The turbine hub 42 is disposed on the inner peripheral side of the hub flange 41. The turbine hub 42 includes a boss portion 42a and a flanged portion 42b. It should be noted that FIG. 2 illustrates only the flanged portion 42b of the turbine hub 42 without illustrating the boss portion 42a.

The boss portion 42a is a tubular member supporting the inner peripheral edge of the turbine support 19 at the transmission-side end thereof in a relatively rotatable state. Further, the boss portion 42a includes a spline hole 42c on the inner peripheral surface thereof. The spline hole 42c is allowed to be engaged with the transmission shaft.

The flanged portion 42b is a disc-shaped portion extended radially outwards from the boss portion 42a. As illustrated in FIG. 2, the flanged portion 42b includes a plurality of teeth 42d on the outer peripheral edge thereof. Each tooth 42d is positioned within each notch 41d of the hub flange 41. Each tooth 42d has a circumferential length shorter than that of each notch 41d. Therefore, the hub flange 41 and the turbine hub 42 are allowed to be rotated relatively to each other until each tooth 42d makes contact with the circumferential end of each notch 41d.

The paired clutch plates 43 are formed in the same shape, i.e., a disc shape. Each clutch plate 43 includes a plurality of window holes 43a positioned to be matched with the radially inner side elongated holes 41b of the hub flange 41. Each window hole 43a supports each radially inner side torsion spring 45. Further, the paired clutch plates 43 are fixed to the turbine hub 42 by means of a plurality of rivets 52 in a relatively non-rotatable state.

Further, the outer peripheral edges of the paired clutch plates 43 are inserted into the inner peripheries of the first and second retaining plates 38 and 39. More specifically, the outer peripheral edge of the transmission-side clutch plate 43 is inserted between the inner peripheral edge of the first retaining plate 38 and the hub flange 41. On the other hand, the outer peripheral edge of the engine-side clutch plate 43 is inserted between the inner peripheral edge of the second retaining plate 39 and the hub flange 41. When the torsion springs 44 and 45 are herein compressed, rotational difference is produced between the first and second retaining plates 38 and 39 and the paired clutch plates 43. Therefore, contacted parts of these plates slide in contact with each other, and hysteresis torque is therein produced.

(Lock-Up Device)

The lock-up device 8 is disposed in an annular space produced between the front cover 2 and the damper mechanism 35. The lock-up device 8 mainly includes a piston 55, a drive plate 56, a driven plate 57 and a clutch ring 58. The drive plate 56 and the driven plate 57 are herein disposed between the front cover 2 and the piston 55.

The piston 55 is a disc-shaped plate member disposed for axially halving the space produced between the front cover 2 and the turbine 4. The piston 55 has the outer periphery functioning as a flat frictional coupling portion 55a. Further, the front cover 2 includes a flat friction surface opposed to the frictional coupling portion 55a of the piston 55. The piston 55 includes an inner peripheral tubular portion 55b on the inner peripheral edge thereof. The inner peripheral tubular portion 55b is axially extended towards the engine. The inner peripheral surface of the inner peripheral tubular portion 55b is supported by the outer peripheral surface of the boss portion 42a of the turbine hub 42 while being axially and rotational-directionally movable with respect thereto. Further, a sealing ring 60 is disposed between the inner peripheral tubular portion 55b and the outer peripheral surface of the tubular portion 42a of the turbine hub 42.

The drive plate 56 is an annular member fixed to the radially intermediate part of the front cover 2. The outer periphery of the drive plate 56 is axially bent towards the transmission, and the bent portion includes a plurality of protrusions. On the other hand, the driven plate 57 is an annular member fixed to the radially intermediate part of the piston 55 by means of rivets 62. The driven plate 57 includes a plurality of grooves on the outer periphery thereof. The grooves and the protrusions of the drive plate 56 are meshed. With the structure of the drive plate 56 and driven plate 57, the piston 55 is coupled to the front cover 2 while being axially movable and relatively non-rotatable therewith.

The clutch ring 58 is an annular member and includes a disc portion 58a and an engaging portion 58b. The engaging portion 58b is axially extended towards the transmission from the outer peripheral end of the disc portion 58a. The disc portion 58a is disposed between the frictional coupling portion 55a of the piston 55 and the frictional coupling surface of the front cover 2. A pair of friction facings is fixed to the both faces of the disc portion 57a. The engaging portion 58b includes a plurality of protrusions on the tip thereof. The protrusions of the engaging portion 58b are engaged with the notches 38c of the first retaining plate 38 and the notches 39c of the second retaining plate 39.

(Actions)

Next, related actions will be hereinafter explained. Torque is inputted from the engine-side crankshaft to the front cover 2. The impeller 3 is thereby rotated and the operating oil flows from the impeller 3 to the turbine 4. The turbine 4 is rotated by the flow of the operating oil and the torque transmission plate 34 fixed to the turbine 4 is similarly rotated.

In a lower speed range, the lock-up device 8 is turned off (i.e., set to be in a decoupled state). In this case, torque outputted from the turbine 4 is outputted towards the transmission through the torque transmission plate 34 and the damper mechanism 35.

When the speed range is shifted to a predetermined speed range in response to increase in a speed ratio of the torque converter 1, the operating oil is drained out of the space produced between the front cover 2 and the piston 55. The piston 55 is thereby moved towards the front cover 2. As a result, the friction facings of the clutch ring 58 are interposed and held between the piston 55 and the frictional coupling surface of the front cover 2, and the lock-up device 8 is turned on (i.e., set to be in a coupled state). Torque of the front cover 2 is accordingly transmitted to the damper mechanism 35 through the piston 55 and the clutch ring 58 and is outputted towards the transmission without intervention of the impeller 3 and the turbine 4.

As described above, the torque, inputted into the front cover 2 from the engine, is inputted into the damper mechanism 35 through the torque converter main body 6 and the torque transmission plate 34 when the lock-up device 8 is turned off. By contrast, the torque is inputted into the damper mechanism 35 through the lock-up device 8 when the lock-up device 8 is turned on.

In the damper mechanism 35, torque from the turbine 4 is transmitted to the first and second retaining plates 39 and 39 from the torque transmission plate 34 and is further transmitted to the radially outer side torsion springs 44, the hub flange 41 and the radially inner side torsion springs 45. Each of the torsion springs 44 and 45 herein transmits torque to the turbine hub 42 while being compressed. The radially outer side torsion springs 44 and the radially inner side torsion springs 45 are herein configured to act in series through the hub flange 41.

Characteristics of the damper mechanism 35 of the above situation will be hereinafter explained from the static perspective. When torque is inputted into the damper mechanism 35 and the respective torsion springs 44 and 45 are compressed, the hub flange 41 and the turbine hub 42 are rotated relatively to each other. When the relative rotation angle (i.e., a torsion angle) is increased, each tooth 42d of the turbine hub 42 makes contact with the inner peripheral end of each notch 41d of the hub flange 41. Therefore, the hub flange 41 and the turbine hub 42 are unitarily rotated thereafter.

When torque from the engine is further increased after each tooth 42d of the turbine hub 42 makes contact with the circumferential end of each notch 41d of the hub flange 41, the torsion angle of the first and second retaining plates 38 and 39 with respect to the hub flange 41 is increased and the radially outer side torsion springs 44 are further compressed. In this case, the turbine hub 42 and the hub flange 41 are unitarily rotated. Therefore, only the radially outer side torsion springs 44 are compressed whereas the radially inner side torsion springs 45 are not compressed.

It should be noted that the torsion angle of the first and second retaining plates 38 and 39 with respect to the hub flange 41 is remarkably increased when excessive torque is inputted into the damper mechanism 35. Therefore, each pair of the press-drawn portions 38a and 39a, formed on the first and second retaining plates 38 and 39, makes contact with the circumferential end of each notch 41c formed on the outer periphery of the hub flange 41. Relative rotation is thereby no longer allowed from the position.

(Hysteresis Torque)

Relative rotation is produced between the input side and the output side when the respective torsion springs 44 and 45 are compressed and extended in activating the damper mechanism 35 as described above. Specifically, the first and second retaining plates 38 and 39 and the clutch plates 43 fixed to the turbine hub 42 are relatively rotated in accordance with variation in torque. When making contact with each other, the inner peripheries of the first and second retaining plates 38 and 39 and those of the clutch plates 43 slide in contact with each other in a dynamic state. Hysteresis torque is thereby produced. In other words, desired hysteresis torque characteristics can be obtained by various changing the specifications (stiffness, size, etc.) of the first and second retaining plates 38 and 39 and the clutch plates 43. Exemplary characteristics will be hereinafter explained.

(i) High Hysteresis Torque at Lower Rotation Speed

To obtain high hysteresis torque at a lower rotation speed range, it is required to produce the retaining plates 38 and 39 with lower stiffness and the clutch plates 43 with higher stiffness. During stoppage, the plates 38, 39 and 40 are set for strongly press-contacting to each other.

In this case, the retaining plates 38 and 39 and the clutch plates 43 are strongly press-contacted at the lower rotation speed range. Therefore, high hysteresis torque is produced.

When the rotation speed is increased, on the other hand, the inner peripheral edges of the retaining plates 38 and 39 with lower stiffness are elastically deformed and outwardly opened by means of centrifugal force. However, the clutch plates 43 with higher stiffness are not easily deformed. Therefore, press-contact force is reduced between the retaining plates 38 and 39 and the clutch plates 43, and hysteresis torque is accordingly reduced.

(ii) High Hysteresis Torque at Higher Rotation Speed

To obtain high hysteresis torque at a higher rotation speed range, it is required to produce the retaining plates 38 and 39 with higher stiffness and the clutch plates with lower stiffness. During stoppage, the retaining plates 38 and 39 and the clutch plates 43 are set for weakly press-contacting to each other.

In this case, the retaining plates 38 and 39 and the clutch plates 43 are weakly press-contacted at the lower rotation speed range. Therefore, low hysteresis torque is produced. When the rotation speed is increased, on the other hand, the retaining plates 38 and 39 with higher stiffness are not easily deformed even when centrifugal force is produced. By contrast, the outer peripheral edges of the clutch plates 43 with lower stiffness are outwardly opened by means of centrifugal force while the radially inner side torsion springs 45 are moved outwards by means of centrifugal force. As a result, the outer peripheral edges of the clutch plates 43 are elastically deformed and outwardly opened. Therefore, press-contact force is increased between the retaining plates 38 and 39 and the clutch plates 43, and hysteresis torque is accordingly increased.

(Features)

In the aforementioned exemplary embodiment, the damper mechanism 35 and the torque transmission plate 34 fixed to the turbine 4 are engaged on the radially inner side of the torus center. Therefore, members forming the engaging part 51 can be compactly formed and weight reduction thereof can be realized. Further, a relatively large space is produced on the radially inner side of the torus center, and the engaging part 51 is disposed therein. Therefore, it is possible to inhibit axial size increase of the engaging part 51.

A hysteresis torque producing mechanism is realized using the retaining plates 38 and 39 and the clutch plates 43. In other words, a special member is not required to produce hysteresis torque. Further, hysteresis torque can be arbitrarily regulated by changing the specifications of the retaining plates 38 and 39 and the clutch plates 43.

Modifications of First Exemplary Embodiment (a) In the aforementioned exemplary embodiment, the present invention is applied to the torque converter including the lock-up device. However, the present invention can be similarly applied to a torque converter without including the lock-up device.

(b) In the aforementioned exemplary embodiment, the damper mechanism includes the radially outer side torsion springs and the radially inner side torsion springs. However, the present invention can be similarly applied to a damper mechanism including only the radially outer side torsion springs without including the radially inner side torsion springs.

(c) The positional relation can be reversed for the grooves and protrusions, which are formed on the members forming the engaging part.

Second Exemplary Embodiment

Figure 3:
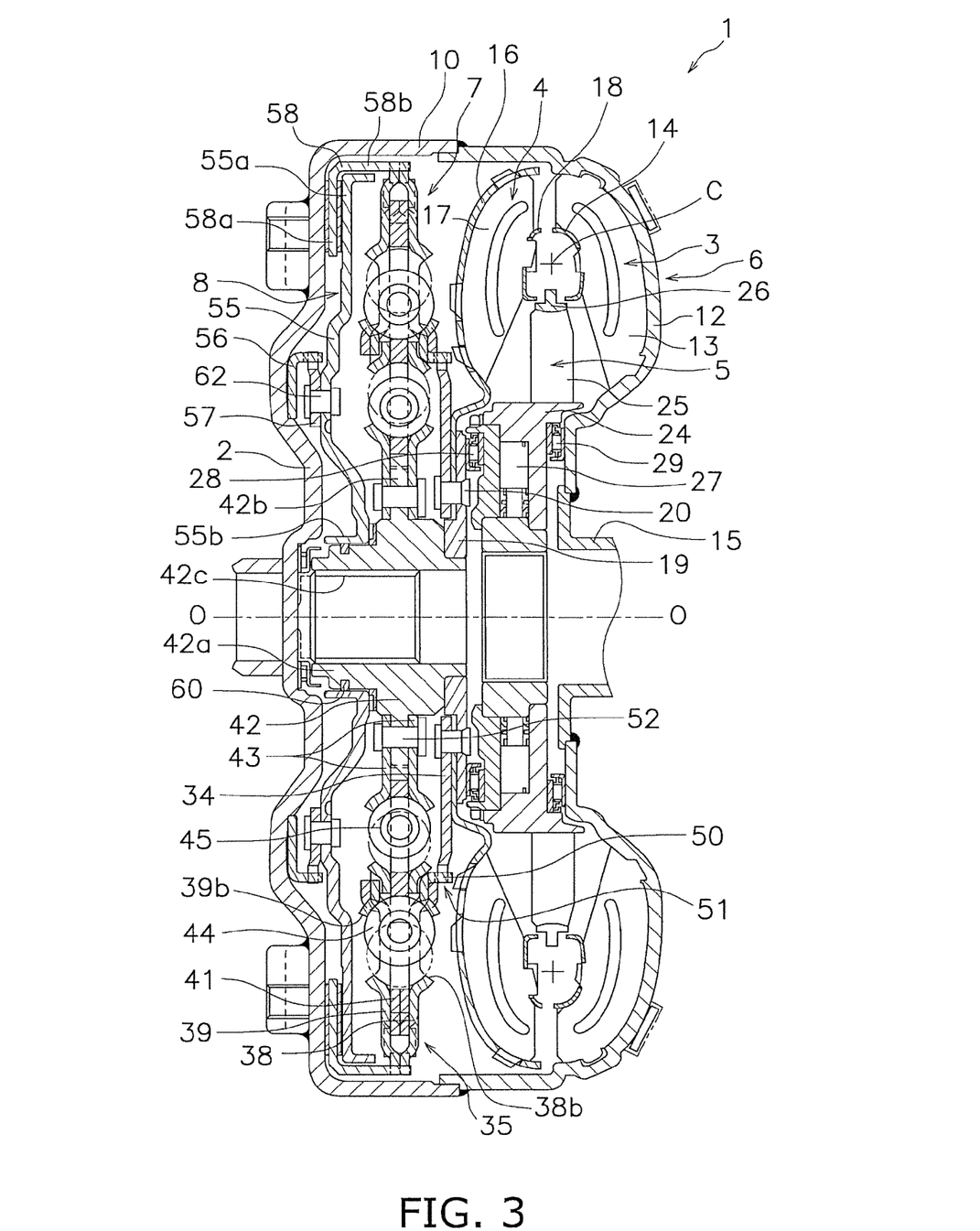
FIG. 3 is a partial cross-sectional view of a torque converter including a power transmission device according to a second exemplary embodiment of the present invention.
Figure 4:
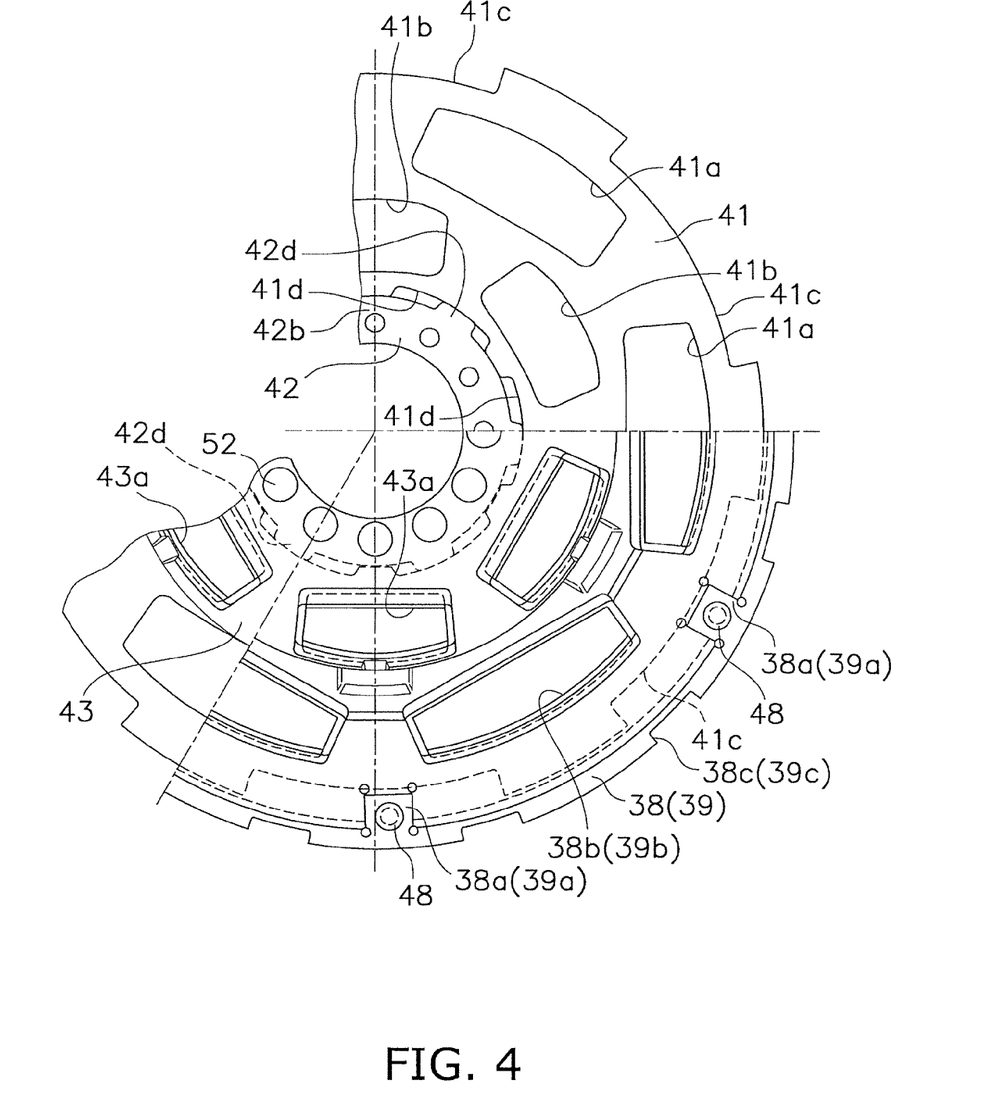
FIG. 4 is a partial front view of the power transmission device illustrated in FIG. 3.

FIG. 3 is a partial cross-sectional view of the torque converter 1 embedded with a power transmission device according to a second exemplary embodiment of the present invention. Further, FIG. 4 is a partial front view of the power transmission device according to the second exemplary embodiment. FIG. 4 omits illustration of torsion springs as elastic members and some of the other members. In the drawings, the same reference numerals are assigned to the same components as those of the first exemplary embodiment. Further, explanation will be hereinafter omitted for the same structures as those of the first exemplary embodiment.

In the first exemplary embodiment, the stopper part for restricting relative rotation of the input-side member and the output-side member is formed by the press-drawn portions 38a and 39a of the first and second retaining plates 38 and 39 and the notches 41c of the hub flange 41. The second exemplary embodiment is the same as the first exemplary embodiment except for the structure of the stopper part.

(Stopper Part)

Figure 5:
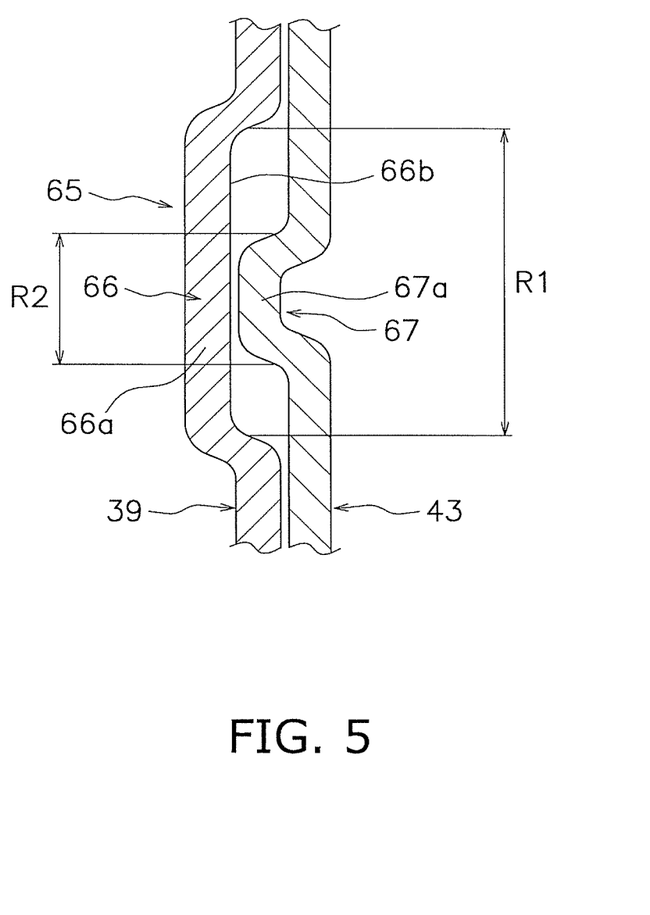
FIG. 5 is a enlarged cross-sectional view of a stopper part of the power transmission device illustrated in FIG. 3.

As illustrated in a enlarged cross-sectional view of FIG. 5, one of the clutch plates 43 and the first retaining plate 38 form one stopper part 65 while the other of the clutch plates 43 and the second retaining plate 39 form the other stopper part 65 in order to restrict relative rotation (i.e., a torsion angle) between the plates 43 and the first and second retaining plates 38 and 39. FIG. 3 illustrates one of the stopper parts 65 (i.e., the left-side one in FIG. 3). However, the other of the stopper parts 65 has the same structure as this.

Each stopper part 65 include an input-side engaging portion 66 and an output-side engaging portion 67. The input-side engaging portion 66 is formed on each of the retaining plates 38 and 39. The output-side engaging portion 67 is formed on each of the clutch plates 43.

The input-side engaging portion 66 is formed on the inner peripheral edge of each of the retaining plates 38 and 39 by means of press processing. The input-side engaging portion 66 is an axially convexo-concave portion having a corrugated shape. Specifically, each of the first and second retaining plates 38 and 39 includes first protrusions 66a protruded from the inner peripheral edge thereof to the axially outward (i.e., towards the transmission (for the first retaining plate 38) or towards the engine (for the second retaining plate 39)). Each first protrusion 66a includes a first space 66b on the axially inner side thereof. The first space 66b is formed in a first rotation angular range R1.

On the other hand, the output-side engaging portion 67 includes second protrusions 67a formed by pressing a part of the outer peripheral edge of each clutch plate 43 axially outwards by means of press processing. More specifically, each second protrusion 67a is inserted into each first space 66b of the respective retaining plates 38 and 39. Further, each second protrusion 67a is continuously formed on the axially outer side of each clutch plate 43 in a second rotation angular range R2 less than the first rotation angular range R1.

In the aforementioned stopper parts 65, the retaining plates 38 and 39 and the clutch plates 43 can be rotated relatively to each other in an angular range that each second protrusion 67a is movable within the first space 66b. Further, each second protrusion 67a makes contact with an end of the first space 66b when excessive torque is inputted into the damper mechanism 35. Relative rotation is thereby prevented between the retaining plates 38 and 39 and the clutch plates 43.

(Features)

In the aforementioned second exemplary embodiment, the stopper parts are formed by the parts where the inner peripheral edges of the retaining plates 38 and 39 are axially overlapped with the outer peripheral edges of the clutch plates 43. Therefore, the stopper mechanism can be realized with a simple structure.

Unlike the well-known power transmission device, members such as rivets and stop pins are not herein required. Therefore, the power transmission device can be further compactly formed. Further, the hub flange is not herein used as the stopper mechanism. Therefore, stress acting on the hub flange can be relieved.

Modification of Second Exemplary Embodiment

Figure 6:
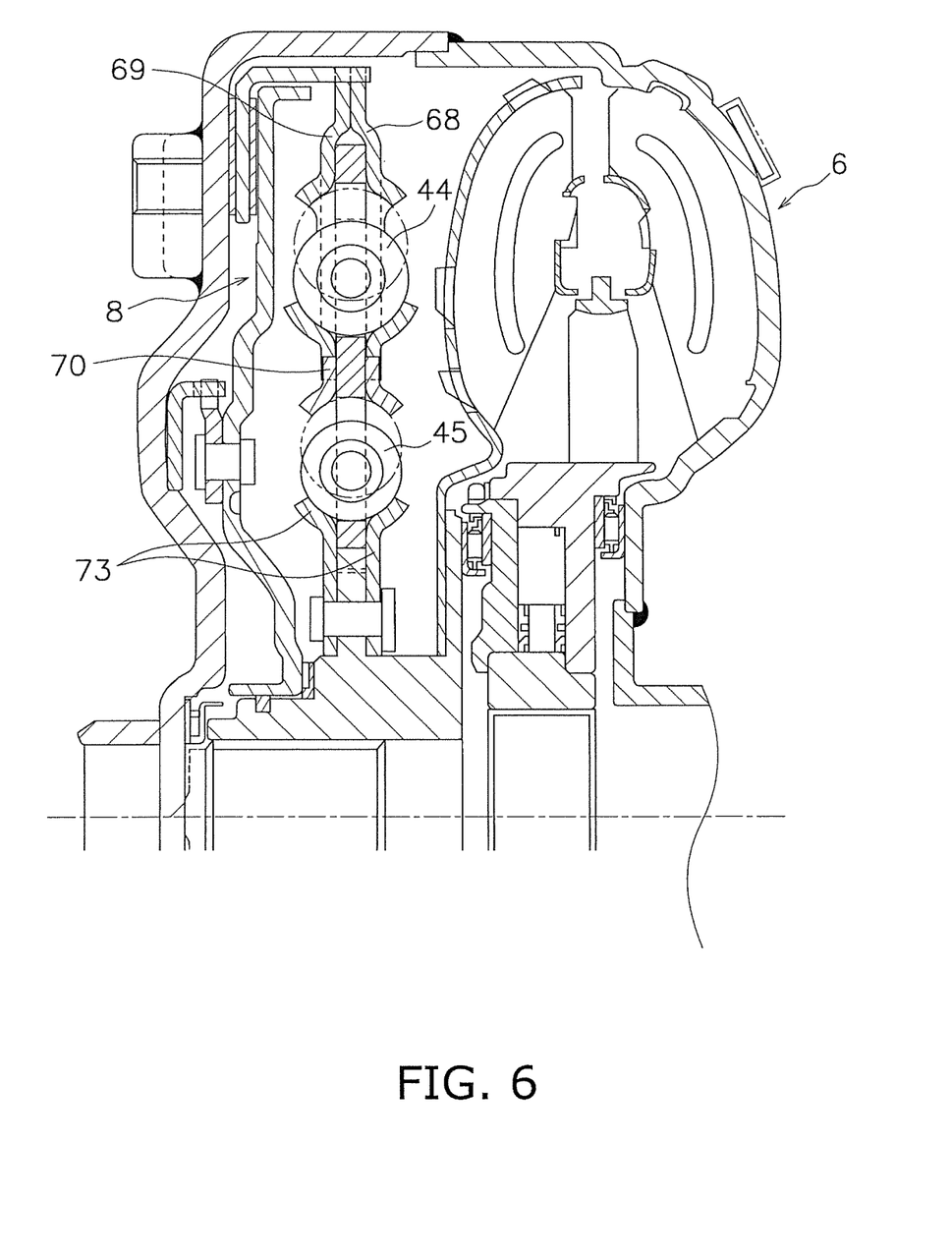
FIG. 6 is a diagram corresponding to FIG. 3 according to a third exemplary embodiment of the present invention.
Figure 7:
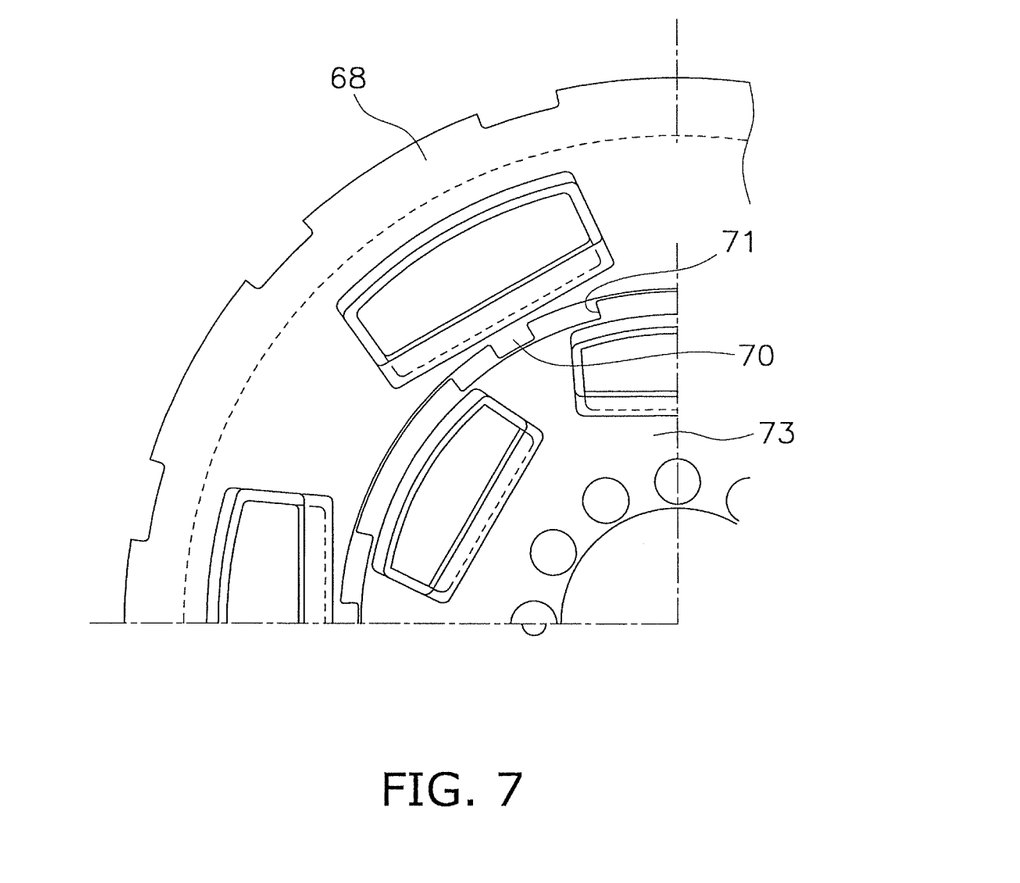
FIG. 7 is a diagram corresponding to FIG. 4 according to the third exemplary embodiment of the present invention.

FIGS. 6 and 7 illustrate stopper parts according to another exemplary embodiment. The exemplary embodiment illustrated in FIGS. 6 and 7 is completely the same as the aforementioned exemplary embodiment except for members forming the stopper parts.

In the present exemplary embodiment, each of retaining plates 68 and 69 includes a plurality of pawls 70 on the inner peripheral edge thereof. The pawls 70 are aligned at predetermined intervals in the circumferential direction of each of the retaining plates 68 and 69. The pawls 70 are protruded radially inwards. On the other hand, each of clutch plates 73 includes a plurality of notches 71 on the outer peripheral edge thereof. The notches 71 are opened radially outwards. Each pawl 70 is inserted into each notch 71 of each clutch plate 73. Each pawl 70 has a rotation-directional width sufficiently less than that of each notch 71. In other words, the retaining plates 68 and 69 and the clutch plates 73 can be rotated relatively to each other in the angular range where each pawl 70 is movable within each notch 71. When each pawl 70 makes contact with an end of each notch 71, relative rotation (i.e., torsion) is prevented between the retaining plates 68 and 69 and the clutch plates 73.

The present exemplary embodiment can also achieve the same advantageous effects as those achieved by the aforementioned exemplary embodiment. In this case, however, it is impossible to realize a hysteresis torque producing mechanism utilizing the slide contact between the retaining plates 68 and 69 and the clutch plates 73.

Other Exemplary Embodiments

The present invention is not limited to the aforementioned exemplary embodiments, and a variety of changes or modifications can be herein made without departing from the scope of the present invention.

INDUSTRIAL APPLICABILITY

According to the present invention, it is possible to achieve reduction in size and weight of, and inhibition of axial size increase of, a power transmission device for a torque converter.

Further, it is possible to easily and reliably obtain strength required to hold elastic members, especially, in a power transmission device including a damper mechanism with a widened damper torsion angle. Further, it is possible to easily regulate hysteresis torque using members forming a damper mechanism on an as-needed basis.

Yet further, it is possible to realize a stopper part of the damper mechanism with a simple structure.

The invention claimed is:
1. A power transmission device for a torque converter, the power transmission device disposed between a torque converter main body having a torus center and a front cover coupled to an engine-side member, the power transmission device configured to transmit torque outputted from a turbine of the torque converter main body to a transmission-side member, the power transmission device comprising:
   an output member fixed to the turbine;
   a damper mechanism disposed between the front cover and the turbine, the damper mechanism elastically coupling the output member and the transmission-side member, the damper mechanism including first and second elastic members, first and second input plates and an output-side member disposed between the first and second input plates in an axial direction, the second elastic member being disposed radially inwardly of the first elastic member, the first input plate being connected to the output member and the output-side member being connected to the transmission-side member;
   an engaging part coupling the output member and the damper mechanism on a radially inner side of the torus center, the engaging part being disposed between the torus center and a center of the second elastic member; and
   a clutch member disposed between the front cover and the damper mechanism, the clutch member being directly coupled to the first and second input plates such that the clutch member is axially movable and non-rotatable relative to the first and second input plates.

2. The power transmission device for the torque converter recited in claim 1, wherein
   the output member includes either a first groove or a first protrusion,
   the damper mechanism includes
      the first input plate including either a second protrusion to be engaged with the first groove or a second groove to be engaged with the first protrusion
      an output-side member coupled to the transmission-side member, and
      the first elastic member elastically coupling the first input plate and the output-side member in a rotational direction, and
   the engaging part is formed by either a combination of the first groove and the second protrusion or a combination of the second groove and the first protrusion,
   the engaging part is positioned radially inwards of the first elastic member.

3. The power transmission device for the torque converter recited in claim 2, wherein
   the output member is a disc-shaped plate including an inner periphery fixed to an inner periphery of the turbine, and an outer periphery on which the first groove or the first protrusion is configured, and
   the first input plate is a disc-shaped plate including a support portion supporting the first elastic member, and an inner periphery on which the second protrusion or the second groove is configured.

4. The power transmission device for a torque converter recited in claim 2, wherein
   the second input plate is disposed axially away from the first input plate at a predetermined interval;
   the second elastic member is configured to transmit the torque to first and second output plates, the second elastic member being supported by the first and second output plates in radially inner side of the first elastic member; and
   the first and second output plates are allowed to be coupled to the transmission-side member, the output plates being disposed away from each other at a predetermined interval, wherein each of the first and second input plates is a disc-shaped plate, the first elastic member is supported by the first and second input plates the output-side member is disposed axially between the first and second input plates, the output-side member causes the first elastic member and the second elastic member to act in series, and a part of the first and second input plates and a part of the first and second output plates are opposed in a direction along a rotational axis.

5. The power transmission device for the torque converter recited in claim 4, wherein each of the first and second input plates has an annular shape and includes a first window for supporting the first elastic member, each of the first and second output plates has an annular shape and includes a second window for supporting the second elastic member, each of the first and second output plates are disposed radially inwards of the first and second input plates, and the first and second output plates include outer peripheries inserted between inner peripheries of the first and second input plates for partially overlapping the first and second output plates and the first and second input plates in the direction along the rotational axis.

6. The power transmission device for the torque converter recited in claim 4, further comprising an output hub fixed to the first and second output plates, wherein the output-side member and the output hub are rotatable relatively to each other in a predetermined angular range.

7. The power transmission device for the torque converter recited in claim 4, wherein a part of the first and second input plates opposing a part of the first and second output plates in the direction along the rotational axis slidably makes contact with the part of the first and second output plates.

8. The power transmission device for the torque converter recited in claim 2, further comprising the second input plate disposed axially away from the first input plate at a predetermined interval;

the second elastic member configured to transmit the torque to the first and second output plates, the second elastic member supported by the first and second output plates on a radially inner side of the plural first elastic members; and first and second output plates allowed to be coupled to the transmission-side member, the first and second output plates disposed away from each other at a predetermined interval, wherein each of the first and second input plates is a disc-shaped plate, the first elastic member supported by the first and second input plates, the output-side member is disposed axially between the first and second input plates, the output-side member causes the first elastic member and the second elastic member to act in series, and the first and second input plates and the first and second output plates form a pair of stopper parts, the stopper parts configured to cause the input plates and the first and second output plates to be engaged when a relative rotation angle between the first and second input plates and the first and second output plates exceeds a predetermined relative rotation angular range.

9. The power transmission device for the torque converter recited in claim 8, wherein each of the first and second input plates has an annular shape, each of the first and second output plates has an annular shape, the first and second output plates disposed radially inwards of the first and second input plates, each of the first and second input plates includes a plurality of input-side engaging portions on an inner peripheral edge thereof, the input-side engaging portions are aligned at predetermined intervals in a rotational direction, and each of the first and second output plates includes a plurality of output-side engaging portions on an outer peripheral edge thereof, the output-side engaging portions are aligned at predetermined intervals in a rotational direction, and the plurality of output-side engaging portions are engaged with the plurality of input-side engaging portions.

10. The power transmission device for the torque converter recited in claim 9, wherein the input-side engaging portions are third protrusions protruding axially outwards, each of the first protrusions includes a first space on an axially inner side thereof, the first space is formed in a first rotation angular range, the output-side engaging portions are fourth protrusions protruding axially outwards, each of the fourth protrusions are inserted into each of the first spaces, and each of the fourth protrusions is formed on an axially outer side of each of the first and second output plates in a second rotation angular range less than the first rotation angular range.

11. The power transmission device for the torque converter recited in claim 9, wherein the input-side engaging portions are pawls formed at the predetermined intervals on the inner peripheral edge of each of the first and second input plates, the output-side engaging portions are notches formed on the outer peripheral edge of each of the first and second output plates, and each of the notches receives each of the pawls to be inserted therein for allowing each of the pawls to be rotated in a predetermined angular range.

* * * * *